010F# United States Patent Office 3,557,427
Patented Jan. 26, 1971

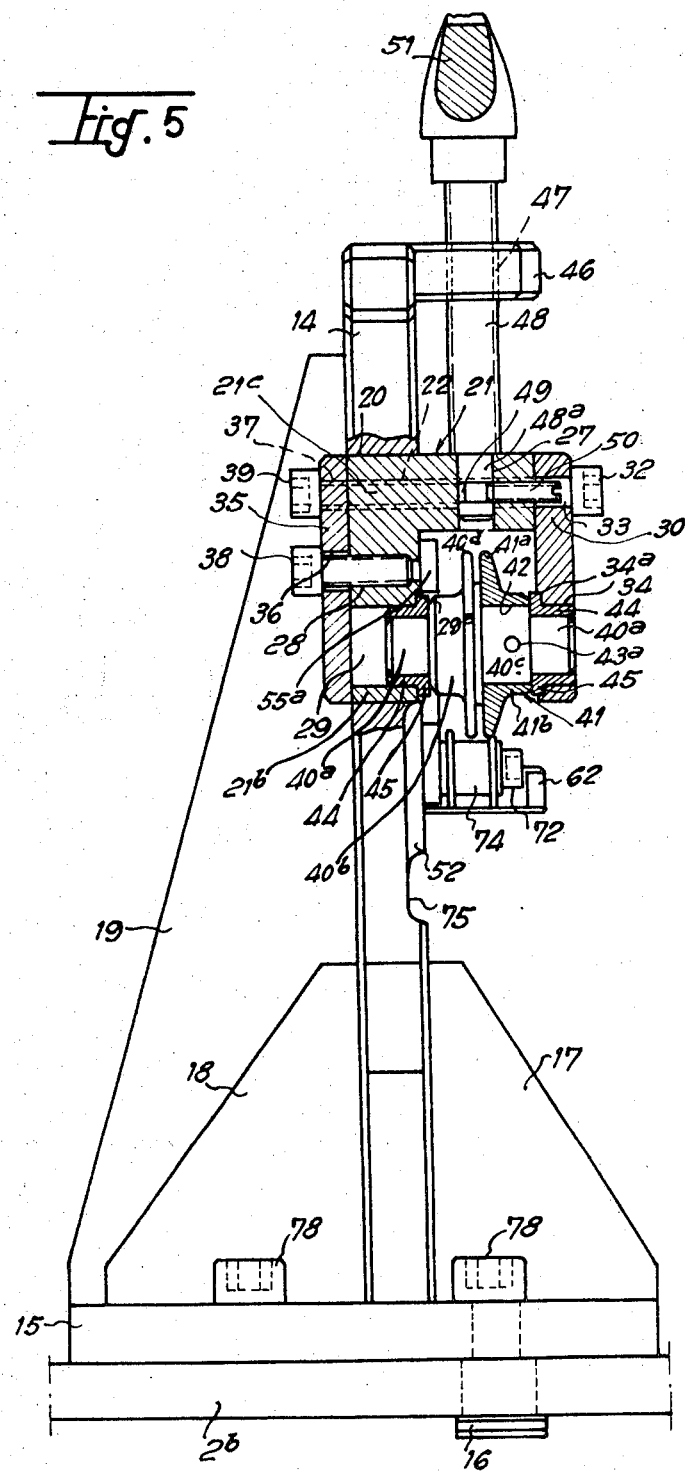

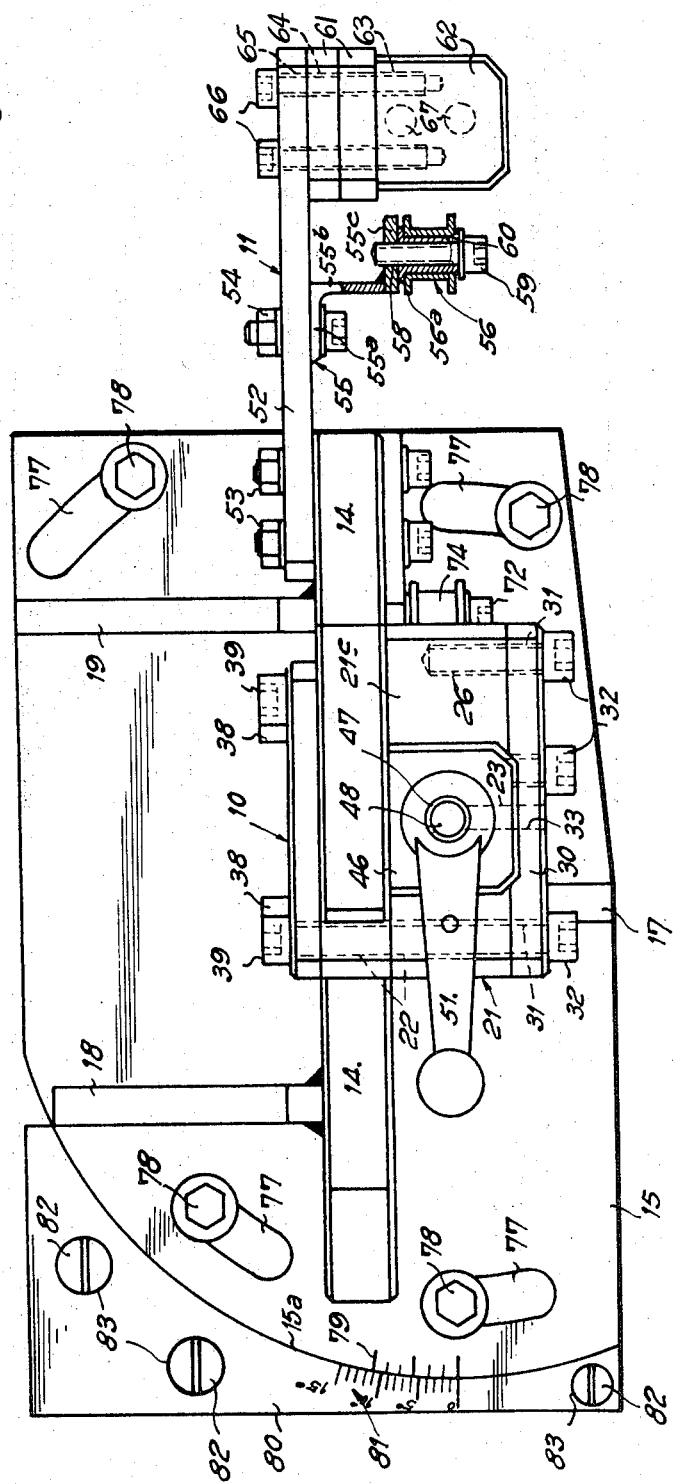

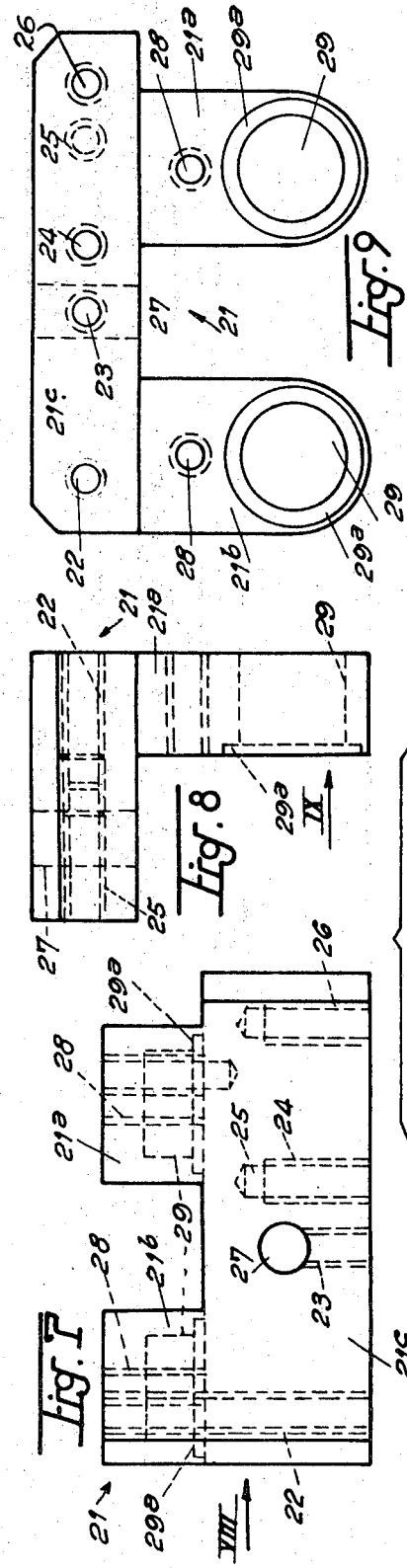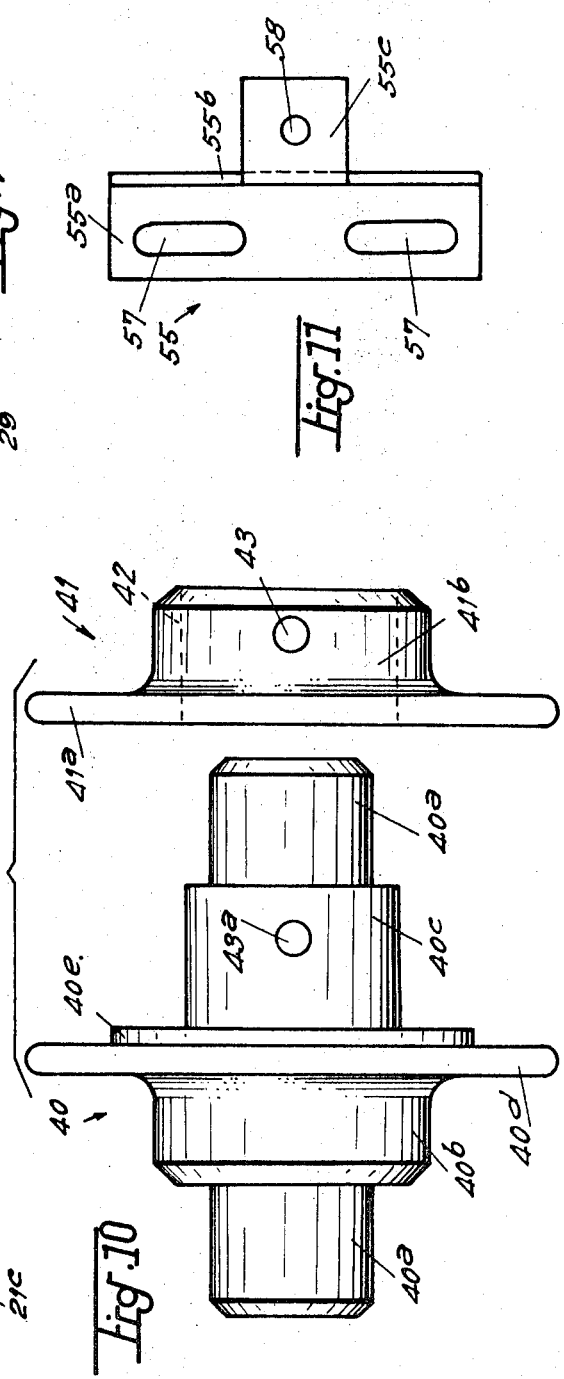

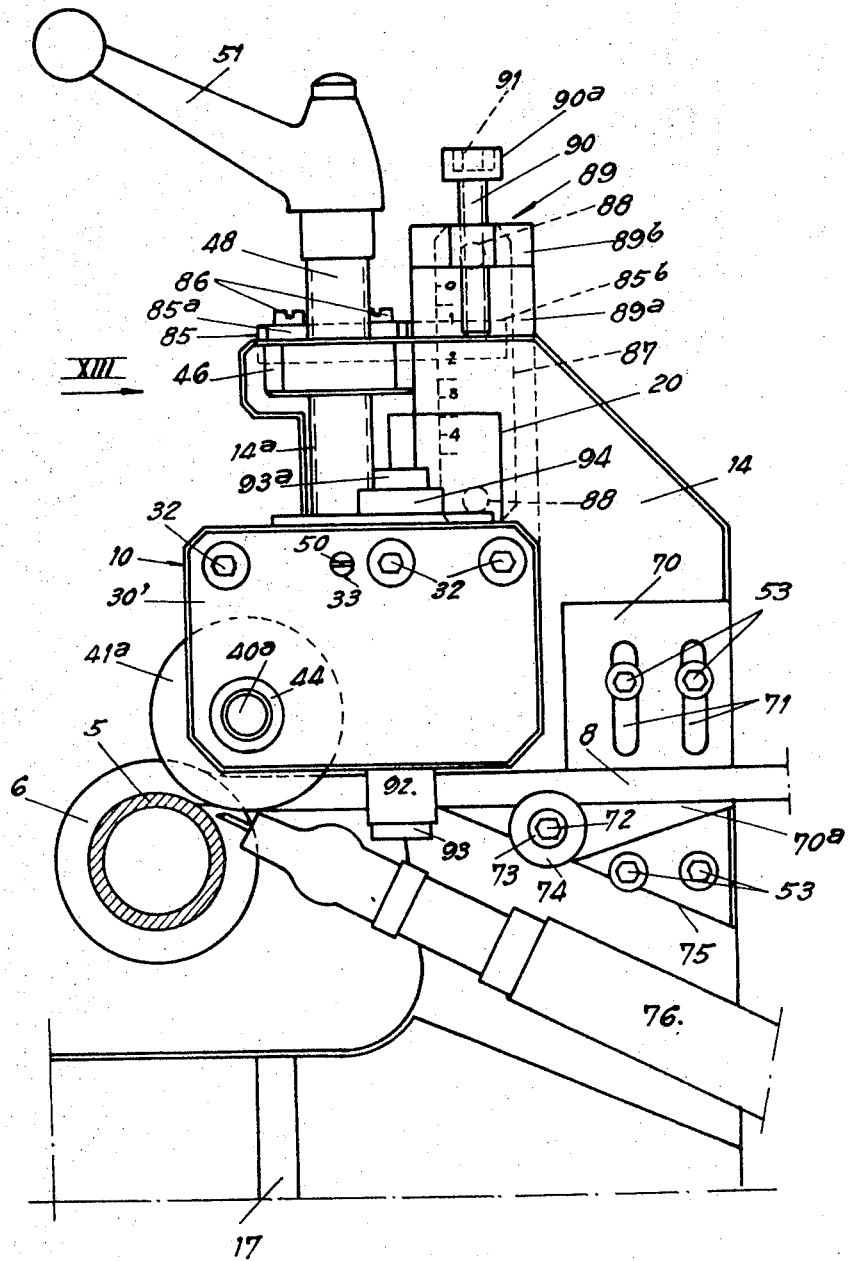

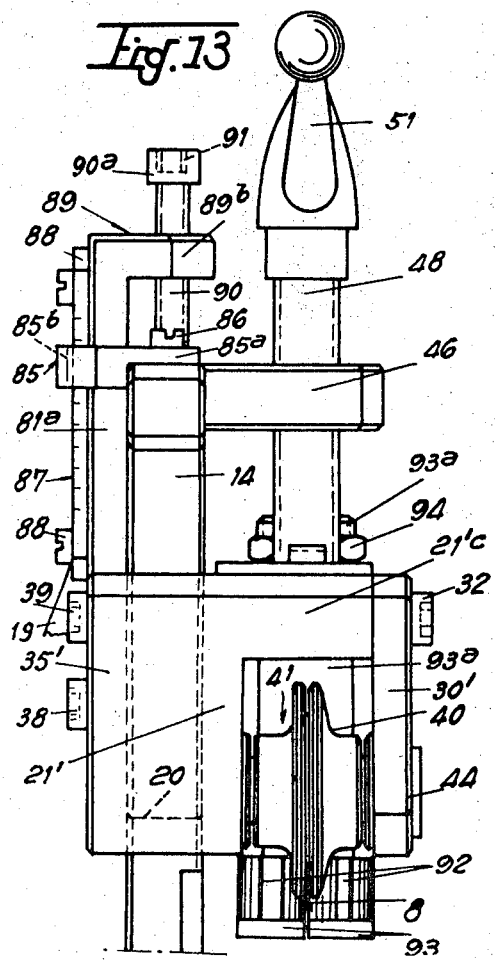

3,557,427
MACHINE FOR GUIDING, FORMING AND APPLYING A STRIP SPIRALLY AROUND A TUBE
Edmond Pignal, Thonon-les-Bains, France, assignor to Societe des Fabrications Biraghi-Entrepose, Paris, France, a company of France
Filed Oct. 23, 1968, Ser. No. 769,823
Claims priority, application France, Oct. 23, 1967, 125,455
Int. Cl. B23p 15/26
U.S. Cl. 29—202
17 Claims

ABSTRACT OF THE DISCLOSURE

A machine for winding and welding a metal strip around a sealed exchanger tube to form a helical fin, using a welding electrode positioned in the angle between the strip and the tube surface. The tube is rotated while the strip is applied, the strip and electrode being supported on a longitudinally movable carriage. A vertical platen is secured to the carriage of the machine and angularly adjustable in a vertical plane and has a movable block carrying a pressure roller vertically slidable in an aperture therein. A grooved pressure roller is mounted in the block for contacting the upper edge of the strip. Guide rollers are mounted with their axes horizontal and of adjustable height to cooperate with the lower and the upper edge of the strip, respectively. Two further guide rollers having their axes vertical cooperate with the two faces of the strip.

---

Figure 1:
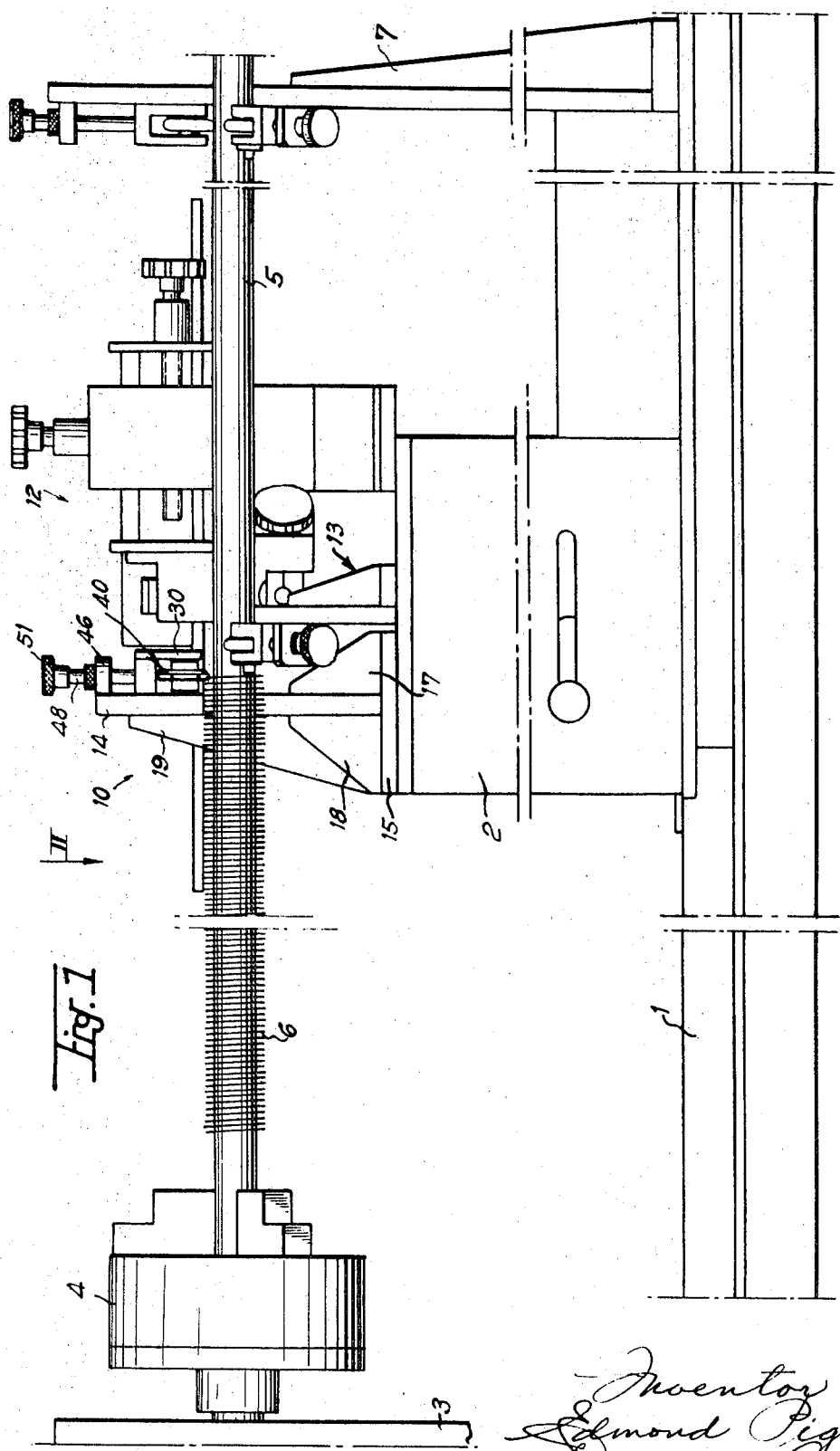

The present invention relates to apparatus for producing gilled or finned tubes by applying a strip spirally around the tube and welding the strip in position, and is concerned more specifically with means for guiding the strip in the vicinity of the tube.

The invention is particularly applicable to apparatus of the general type described in my U.S. Patent No. 3,436,517 and in my copending U.S. patent application Ser. No. 769,824 that is to say apparatus for manufacturing gilled or finned tubes, for example for heat exchangers, of the type in which the gills are constituted by a strip wound spirally around the tube; comprising means for supporting the tube and for imparting to it a rotary movement about its axis, means for guiding and for applying around the tube the edge of a strip unwound from a spool, the angle of the strip to the axis of the tube being less than 90°, a support to hold a welding torch or electrode in the plane of the strip, in the angle which the edge of this latter forms with the tube, and means for displacing, parallel with the axis of the tube, the strip guide means and the torch or electrode support, the tube being connected to one pole of the welding current source, while the other pole is connected to the electrode or welding torch.

More precisely, the object of the invention is to provide an apparatus for guiding the strip in the vicinity of a tube in a machine for producing spirally gilled or finned tubes comprising a vertical platen secured to the carriage of the machine so as to be angularly adjustable in a vertical plane, said platen having a vertical elongated aperture, a movable block carrying a pressure roller and slidable vertically in the said elongated aperture, a threaded control rod which is screwed into a horizontal plate integral with said platen and carrying said movable block, at least one grooved pressure roller mounted in said movable block and adapted to co-operate with the upper edge of the strip, a guide roller support secured to said platen, two guide rollers mounted on horizontal axes spaced in the longitudinal direction of the strip, and mounted on said support so as to be adjustable in height in order that the one of said guide rollers which is closest to said pressure rollers co-operates with the lower edge of the strip while the other guide roller co-operates with the upper edge of the strip, and two further guide rollers on vertical axes arranged to co-operate with the two faces of the strip in order to guide the same.

Preferably, the platen is L-shaped and the means for securing said platen to the carriage of the machine comprises a horizontally-disposed plate on which is secured one flange of the L-shaped platen, a pivot connecting said plate to the carriage, said plate having four curved elongated apertures, corresponding bolts screwed into holes in the carriage, a graduation carried by the convex plate and a corresponding graduation integral with the carriage.

In an advantageous embodiment, the movable block comprises: (a) a roller carrier which in plan view is U-shaped, with one arm adapted to engage in the aperture of the platen while the other arm passes around the solid portion of the platen and, in elevation, in a plane parallel with the longitudinal plane of the machine, is L-shaped, the horizontal flange being provided with horizontal threaded holes to accommodate fixing screws and one vertical smooth hole for passage of the threaded control rod, while the vertical flange, that is to say each arm of the U, is provided with a horizontal threaded hole for a fixing screw and at least one arm is also provided with a smooth hole for passage of the spindle of a pressure roller; (b) a substantially trapezoidal side plate provided with holes corresponding to the aforesaid hole; (c) and a plate likewise provided with fixing holes corresponding to certain of the aforesaid holes.

The or each pressure roller preferably comprises a male portion on which is provided a bearing surface to contact the length of strip, and a female portion connected by a pin to the male portion during assembly.

According to a further preferred feature of the invention, the guide roller support comprises a base plate bolted rigidly to the platen, a first substantially Z-shaped support adjustably fixed to the base plate by means of vertical elongated holes provided in the flange of the Z which is in contact with the said base plate, the flange of the Z parallel with the base plate carrying a guide roller on a horizontal axis, a second support rigidly fixed to the base plate and carrying horizontal journals for two vertical axis guide rollers, and an adjusting plate bolted to the platen so as to be adjustable in height by means of vertical elongated holes, and carrying a second guide roller on a horizontal axis.

It is of advantage for the platen to be notched for passage of a welding torch or electrode intended to weld the strip to the tube and disposed in the plane of the strip.

In another embodiment, the guide apparatus comprises furthermore a graduated plate integral with the movable roller-carrying block and co-operating with a fixed index carried by the platen, and an adjusting screw which is screwed into an angle bracket integral with the movable block and bearing on the top of the platen to allow precision adjustment of the stroke of the movable block in the course of readjustment during operation.

In this case, it is preferable for there to be only one pressure roller on a horizontal axis but in addition two pressure rollers on vertical axes, and adjustably spaced by an eccentric member, said pressure rollers on vertical axes being situated beneath the movable roller-carrying block and one on either side of the strip immediately upstream of the roller on a horizontal axis in the direction of feed of the strip.

Figure 2:
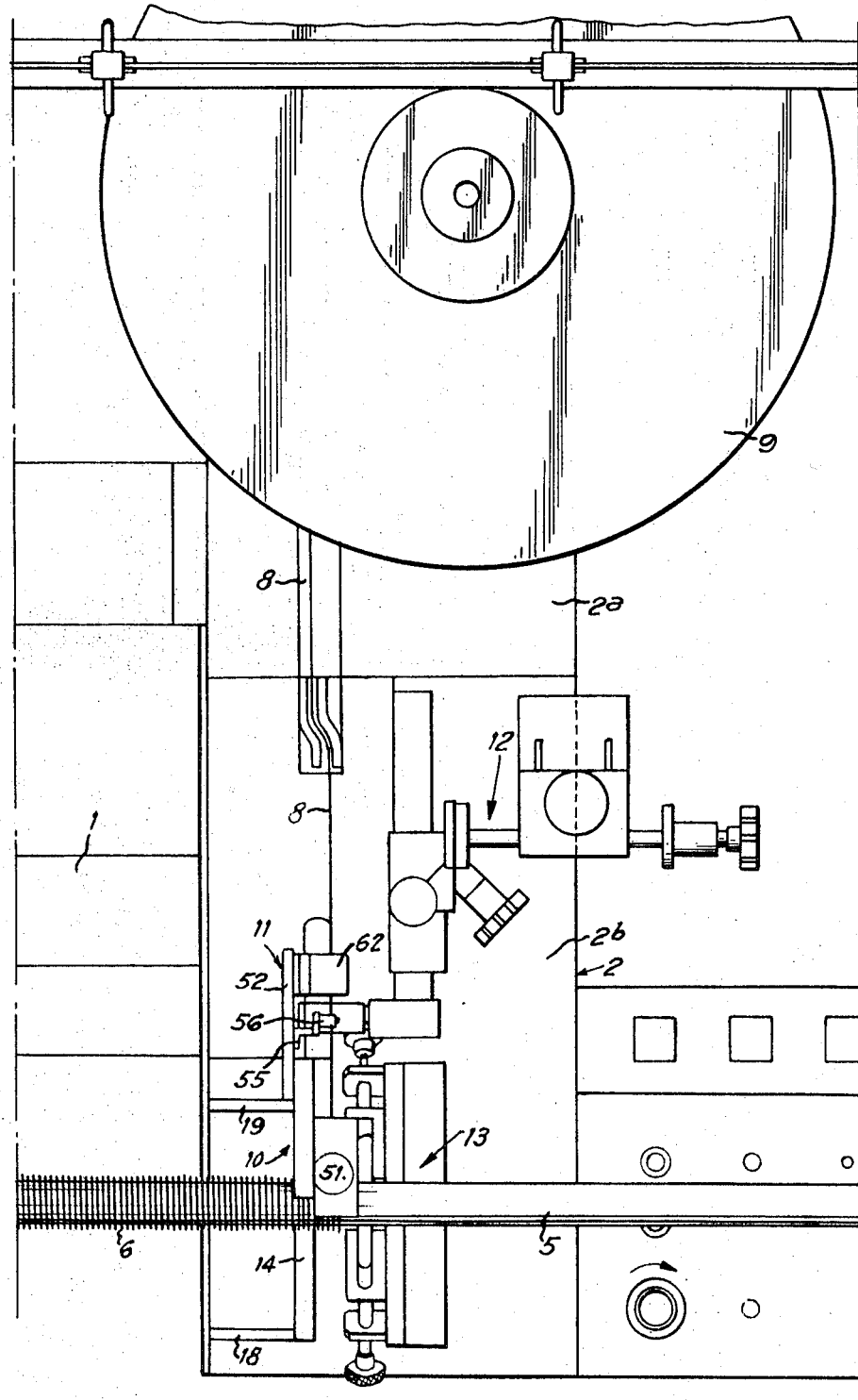
Figure 3:
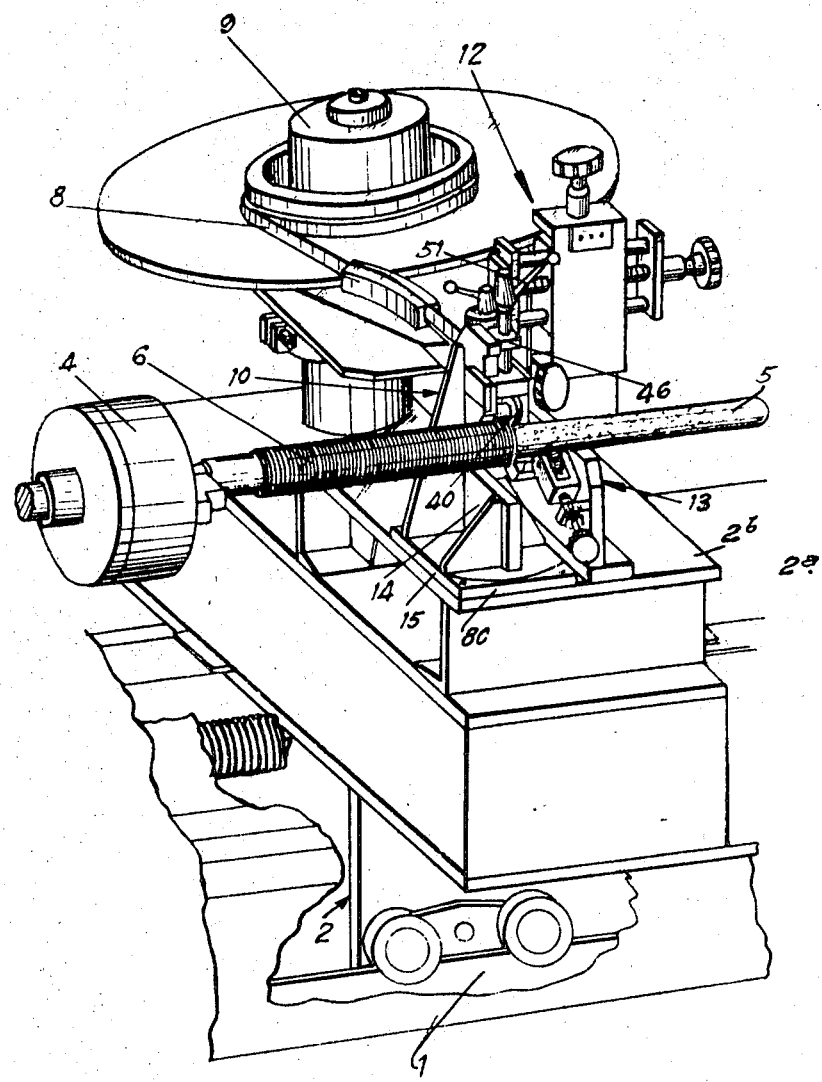
Figure 4:
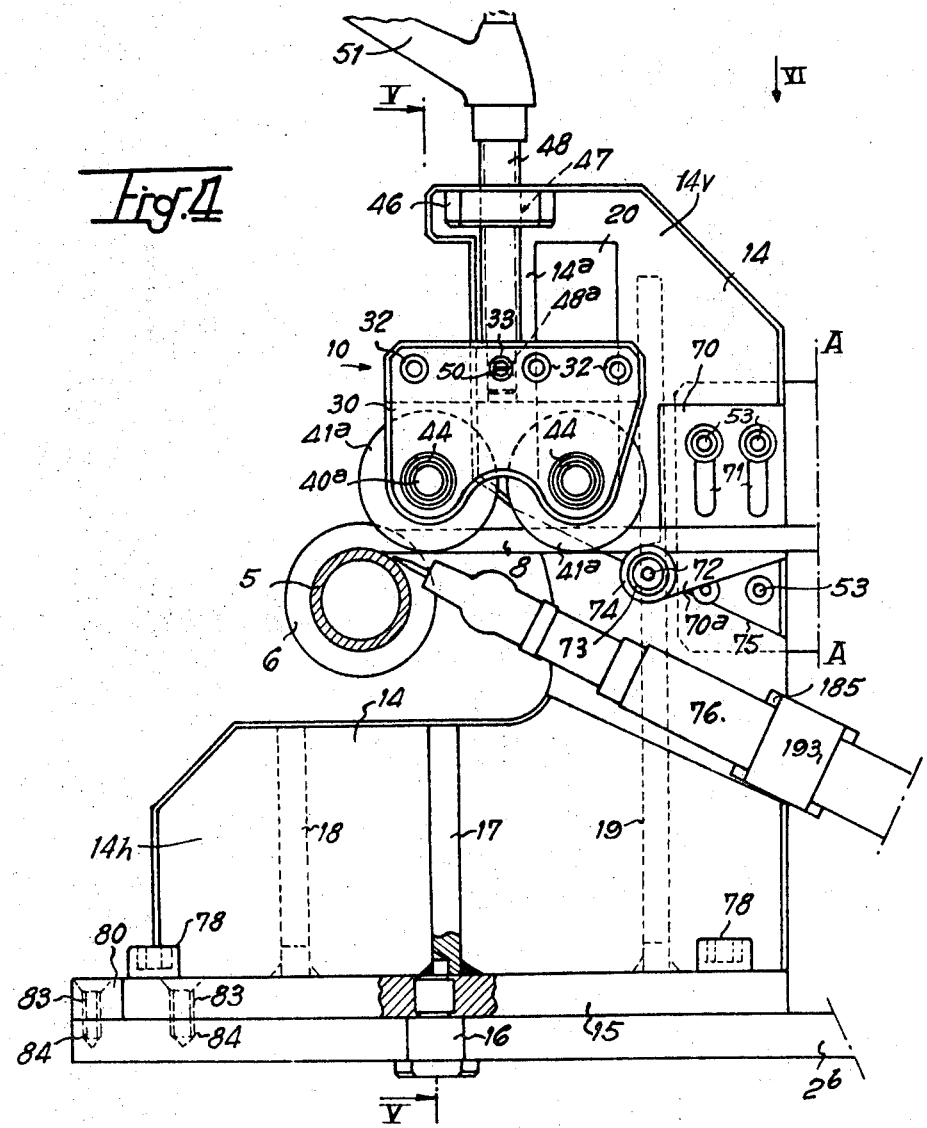
Figure 4A:
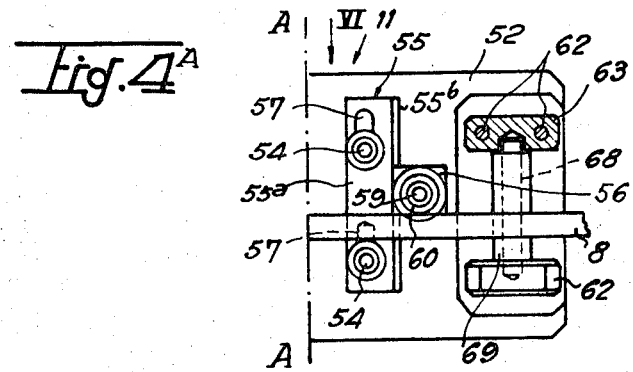

The invention may be performed in various ways and a number of embodiments will now be described by way of example, with reference to the accompanying drawings, some of which are intended to be linked together on the corresponding lines A—A, and in which:

FIG. 1 is an elevation, FIG. 2 a plan and FIG. 3 a perspective view of the machine as a whole, FIGS. 4 and 4a are jointly an elevation on a larger scale, with a partial cross-section, of the means for guiding the strip in the vicinity of the tube, with the torch in the working position, FIG. 5 is a section through FIG. 4, along the line V—V, FIG. 6 is a plan view in the direction of the arrow VI in FIGS. 4 and 4a, with a portion in section to show a detail, FIG. 7 is a plan view of a support for the rollers guiding the strip, FIG. 8 is a view in the direction of arrow VIII in FIG. 7, FIG. 9 is a view in the direction of arrow IX in FIG. 8, FIG. 10 is an exploded view of a pressure roller, on an enlarged scale, FIG. 11 is an elevation through the adjustable support of a strip guide roller, FIG. 12 is an elevation similar to a part of FIG. 4 of an alternative embodiment of the strip guide means in the vicinity of the tube, and FIG. 13 is a view in the direction of the arrow XIII of FIG. 12.

Considering initially FIGS. 1 to 3, it will be seen that the machine of the general type described in the aforesaid patent application comprises a base 1 along which a frame or carriage 2 provided with wheels can be displaced on appropriate rails under the action of a lead screw (FIG. 3) in the manner of a lathe carriage. At one end of the base is mounted a casing 3 (FIG. 1) containing a rotational drive mechanism for a chuck 4 which serves to support one of the ends of a tube 5 which is to be provided with a helical gill or fin 6. The other end of the tube as well as various points along the length thereof, are supported by supports or similar means of which one only is illustrated at 7 (FIG. 1).

The carriage 2 supports tables 2a, 2b, (FIG. 3) at different levels. Table 2a carries a guide system for the strip 8 from which the gill or fin 6 is made, and which unrolls from a spool 9, and table 2b carries the support for the electrode or welding torch. In accordance with the invention, the strip guide and pressure rollers are situated on the same side of the tube as the electrode or the welding torch. This arrangement is clearly visible in the drawings. In FIGS. 1 to 3, the pressure roller carrying assembly is illustrated generally by the reference numeral 10 (FIG. 3), the assembly bearing the guide rollers is indicated by 11 (FIG. 2), and the welding head assembly by 12 (FIG. 2). Also shown in these drawings and indicated generally by the reference numeral 13 is a means for supporting the tube 5 mounted on the frame 2 in the vicinity of the assembly 11.

The strip guide apparatus will now be described in greater detail with reference to FIGS. 4 to 10.

The assembly 10 which carries the pressure rollers, comprises a vertical platen 14 which is generally L-shaped, including a vertical long arm 14v and a horizontal short arm 14h (FIG. 4). Arm 14h is fixed to a horizontal plate 15 which is itself pivoted by a spindle 16 (FIG. 4, bottom) on the table 2b of the carriage 2. The platen 14 is advantageously reinforced by three almost triangular ribs 17 to 19. As shown near the top of FIGS. 4 and 5, the vertical member of the platen 14 is provided with a rectangular aperture 20 to accommodate a pressure roller support 21 (FIGS. 5 to 9). In plan view, this support 21 is generally U-shaped (FIG. 7), with one member 21a adapted to fit into the aperture 20 while the other, 21b, passes with the base 21c of the U around the portion 14a (FIG. 4, top) of the platen 14. In elevation, in a plane parallel with the longitudinal plane of the machine, the support 21 is L-shaped as seen in FIG. 8, the horizontal member thereof being provided with fine horizontal screw-threaded holes 22 to 26 and a smooth vertical hole 27, while the vertical member of the L, that is to say each arm 21a and 21b of the U is provided with a horizontal screw-threaded hole 28 of small diameter and a smooth hole 29 of larger diameter counter-bored at 29a on the face immediately above the part 21c. The purpose of these various holes will be explained hereinafter.

The pressure roller support assembly is completed by a side plate 30, the shape of which can be seen in FIG. 4 and which is provided with three screw-threaded holes 31 (FIG. 6) aligned with the holes 22, 24 and 26 of the support 21, to accommodate screws 32 which connect the side plate 30 to the support 21, a smooth hole 33 of small diameter aligned with the hole 23, and two smooth holes 34 (FIG. 5, center) of larger diameter, counter-bored at 34a on the side of the side-plate which is towards the support 21 and aligned with the holes 29, 29a of this support. Finally, a small plate 35 is secured to the outer end of each arm 21a and 21b of support 21 to hold it within aperture 20 in platen 14. Plate 35 is provided with two smooth holes 36 aligned with the holes 28, and two screw-threaded holes 37 aligned with the holes 22 and 25, bears against the platen 14. Two screws 38, which pass through the holes 36 and screw into the holes 28, and two screws 39, which screw into the holes 37 on the one hand and 22 and 25 on the other, so maintain the roller carrier against the platen.

The pressure rollers (FIGS. 4, 5 and 10) are two in number and each comprises a male part 40 and a female part 41. The male part is shaped as shown in FIG. 10, i.e. it comprises two journals 40a, two flanges 40b, 40c, a rim 40d and a bearing surface 40e. The female part (FIGS. 5 and 10) comprises a rim 41a and a hub 41b and is provided with an axial bore 42 of diameter corresponding to that of the flange 40c. A pin-member (not shown) passing through a hole 43 provided in the periphery of the hub 41b, and through a corresponding hole 43a provided at assembly in the flange 40c, connects the two parts of the roller. The journals 40a themselves are journalled in rings 44 (FIG. 5) provided on the one side with flanges 45 and housed in holes 29, 29a and 34, 34a in the roller carrier.

The platen 14 carries on its upper portion a horizontal plate 46 provided with a screw-threaded hole 47 through which passes a screw-threaded rod 48 (FIGS. 4, 5 and 6), the lower end 48a of which, of small diameter, is formed with an annular groove 49 adapted to co-operate with a headless screw 50 which screws into the hole 23 in the support 21 and passes freely into the hole 33 of the side-plate 30. The shoulder between the parts 48 and 48a of the screw-threaded rod rests against the upper face 21c of the support. In this way, by turning the rod 48 in the screw-threaded hole 47 by means of a knob 51, it is possible to raise and lower the roller carrier along the platen 14, the member 21a sliding in the aperture 20. Thus it is possible to regulate the position of the roller carrier so as to exert the desired pressure on the strip 8. As illustrated in FIG. 4 this strip is introduced between the rims 40d and 41a and its upper edge bears on the surface 40a. The width of this surface corresponds to the thickness of the strip which is thus guided accurately at the same time as it undergoes the desired pressure to apply it against the tube 5. Preferably, as illustrated in FIG. 4, the height of the pressure rollers is regulated so that the lower edge of strip 8 is at a very slightly lower level than the horizontal plane passing through the upper generatrix of the tube 5. If it is desired for this height to be variable, steps are taken to move the pressure rollers away from the vertical plane passing through the axis of the tube 5 at will. For this purpose, for example, it is possible for the long member of the platen 14 to be made in two parts which may slide horizontally in relation to each other, for example, by means of a horizontal elongated aperture disposed in one of these parts, and in which bolts passing through the corresponding holes in the other part may slide and be locked. However, this complication is not generally necessary. The slight deformation in its vertical plane undergone by the strip a short distance before it reaches the tube favours the winding thereof about the tube.

The assembly 11 carrying the guide rollers is fixed to the platen 14 (FIGS. 4, 4a and 6). To this end, it comprises an insulating plate 52 fixed by four bolts 53 (FIG. 4) to the platen 14 and carrying, bolted at 54, a Z-shaped member 55. This member itself carries a guide roller 56 (FIG. 4a) in a manner which will be described hereinafter. The member 55 (FIG. 11) comprises a base plate 55a provided with two vertical elongated holes 57 to accommodate two bolts 53, a vertical part 55b at a right-angle to the plate 55a and a second plate 55c parallel to the first but of small height, disposed almost at the level of the gap separating the elongated holes 57, and carrying a screw-threaded hole 58 to accommodate a screw 59 (FIGS. 4a and 6) which serves to secure to the plate 55c a ring 60 on which is fitted the roller 56. Thus it is possible to adjust the height of this roller by sliding bolts 54 in the elongated holes 57.

Through the medium of two insulating plates 61, the plate 52 also carries two fixed guide supports 62 (FIGS. 4a and 6). In plan view, these supports have the shape shown in FIG. 6. They are provided with screw-threaded horizontal blind holes 63 aligned with corresponding holes 64 in the plate 61, and with the holes 65 in the plate 52, to receive fixing bolts 66. The supports 62 are also provided with two blind holes 67 to accommodate two spindles 68 (FIG. 4a) on which are fitted rings 69 which serve to guide the strip 8. As shown in FIG. 6, the roller 56 comprises two rims 56a and the groove thus provided is aligned with the gap formed between the rings 69, the strip 8 passing under the roller 56 (FIG. 4a).

Finally, the guide means likewise comprises another regulating plate 70 secured to the platen 14 (FIG. 4) by two of the bolts 53. The plate 70 has two elongated holes 71 in which the bolts 53 are capable of sliding, and it is extended by a lug 70a which is offset downwardly and in the direction opposite the plate 52. This lug is provided with a screw-threaded hole to which a guide roller 74 (FIGS. 4 to 6) is secured by a screw 72 and a ring 73. The arrangement is identical to that of the roller 56 and its fixing to the plate 55c, but in this case the roller is placed under the strip.

The platen 14 is provided with an oblique reinforcement 75 (FIGS. 4 and 5) for passage of a welding torch or electrode designated as a whole by 76. Finally, to allow precision adjustment of the orientation of the strip guiding and pressure device, the plate 15 may, as has been stated, pivot at 16 in relation to the table 2b of the carriage 2. For this purpose, it is provided with four curved elongated apertures 77 (FIG. 6) in which bolts 78 screwed into holes in the table 2b can be displaced. The plate 15 is shaped as shown in FIGS. 3 and 6, that is to say a rounded edge 15a bearing a graduation 79 and co-operates with an edge of the same shape of a fixed plate 80 provided with a graduation 81. Screws 82 having recessed heads secure the plate 80 to the table 2b by screwing into screw-threaded holes 83 (FIGS. 4 and 6) aligned with corresponding holes 84 in this table (FIG. 4).

In the alternative embodiment shown in FIGS. 12 and 13, members identical to those which have been previously described carry the same references and the modified members carry the same references but are identified by the use of a prime ('). In this embodiment, one of the two pressure rollers 40, 41 is omitted and the other is mounted to slide in relation to the platen 14.

For this purpose, the roller support 21' (FIG. 13) has no need to have holes 29a in its member corresponding to 21a in FIGS. 7 to 9, and the side-plate 30' comprises only a single hole such as 34 in FIG. 5, aligned with the hole corresponding to the holes 29, 29a of the member 21b in the member 21'.

On the other hand, an index which is generally designated 85 is bolted at 86 to the top horizontal face of the platen 14 and the plate 46. This index comprises a horizontal member 85a and a vertical member 85b, the end of which co-operates with a graduated straight-edge 87 which is bolted at 88 to a support 89 comprising a vertical member 89a and a horizontal arm 89b. An adjustable stop screw 90 has a head 91 in which is provided an hexagonal or other recessed socket to receive an operating key. The screw 90 is screwed into a screw-threaded hole in the member 85a of the index 85 and bears against the top horizontal surface of the platen 14. The arm 89 constitutes in practice an upwards extension of a plate 35' similar to the plate 35 in FIG. 5 and secured by screws 38, 39 to the support 21' as indicated in FIGS. 4 to 6. It is therefore movable with the roller support block under the action of the crank 51 and the screw-threaded rod 48. But when it abuts against the platen 14, the screw 90 limits the downwards movement of the assembly. By screwing the screw 90 to a variable degree into the horizontal arm 89b of the member, it is therefore possible accurately to adjust the height of the roller 40, 41 in relation to the strip 8. The graduated straight-edge 87 makes it possible to mark the correct position and to find it again automatically: it is sufficient to raise the screw 90 to the maximum in order to avoid its striking the top of the platen 14, and to lower the roller carrier until such time as the strip is being suitably guided. At this moment, the screw 90 is brought to abut against the platen 14. During the course of a subsequent operation—for example a change of strip—it will be sufficient to lower the roller support until the screw 90 abuts against the platen 14.

In this alternative embodiment, there are additionally provided two rollers 92 on vertical axes (FIGS. 12 and 13) situated below the movable roller carrying block and one on either side of the strip, immediately before the roller 40, 41 in the direction of feed of the strip 8. The rollers 92 are mounted to rotate loosely on their spindles which are secured in plates generally designated 93. These plates are advantageously mounted on adjustable cam members, not shown, which make it possible to adjust the pressure of the rollers on the faces of the strip 8, and the assembly is fixed to the movable block 21' by a screw-threaded member 93a which traverses a hole in the horizontal portion 21'c of the roller carrier, and is maintained by a nut 94. The purpose of the rollers 92 is to maintain the strip 8 strictly perpendicular to the tube.

In practice, steps are taken so that the rearward displacement of the roller 40, 41 is approximately 25 mm. in relation to the axis of the tube 5, which compels the strip 8 to match the shape of the tube 5, while closing the welding angle.

I claim:

1. In apparatus for forming a cylindrical article having a helical fin attached to its surface, which apparatus comprises a machine frame, means for continuously rotating a cylindrical work piece, means for attaching an elongated strip to the exterior of said work piece as it rotates, and means for guiding an elongated strip to the point of attachment, the improvement in which said means for guiding the strip includes:
   (A) a support structure carried by said machine frame,
   (B) a pressure roller means,
   (C) means mounting said pressure roller on said support structure in an adjustable fixed position along a line generally parallel to said work piece rotational axis in a position for engaging the edge of said strip opposite to that which engages said work piece periphery, (D) a first pair of guide rollers, (E) means mounting said guide rollers for rotation about axes parallel to said work piece rotational axis with one roller periphery positioned to engage the edge of said strip most remote from said first axis, and the other roller positioned to engage the edge of said strip which is closer to said first axis, (F) a second pair of guide rollers, and (G) means mounting each of said second pair of guide rollers for rotation about axes parallel to a radius of said work piece rotational axis with one roller positioned to enage one side of said strip, and the other positioned to engage the other side of said strip.

2. The combination of claim 1, wherein said support means includes a vertical plate mounted on said machine frame, a vertically elongated aperture formed in said vertical plate, a movable block mounted in said aperture to which said pressure roller means is connected, and means for holding said block in a desired position on said aperture.

3. The combination of claim 2 including an angle bracket fixed to said roller carrying block, said angle bracket having a flange extending parallel to a surface of said support means from which it is spaced, and adjusting screw threaded through said angle bracket and extending toward said support means surface, whereby adjusting of said screw may serve as an adjustable stop for said block, and a graduated scale formed on a member attached to said block to serve as an indicator of the position of said block.

4. The combination of claim 2, wherein said work piece rotational axis is horizontal, and said movable block includes a roller carriers which is U-shaped in a horizontal plane with one arm of the "U" positioned within said elongated aperture, and with the other arm of the "U" extending around a solid portion of said vertical plate and into the plane of said plate, one of said arms of the "U" being L-shaped and having a vertical flange extending therefrom and a horizontal flange, a side plate secured to the end of said horizontal flange remote from said vertical flange and extending parallel to said vertical flange, said pressure roller being mounted for rotation in aligned openings in said vertical flange and said side plate.

5. The combination of claim 4, wherein said horizontal flange of the roller carrier has a plurality of horizontally threaded holes therein, said means for securing said side plate to said horizontal flange include screws threaded through said side plate and into said horizontal threaded holes.

6. The combination of claim 4, including a smooth vertical opening in said movable blocks within which said vertical threaded rod is fixed.

7. The combination of claim 4, including a second side plate secured to the outer end of the U-leg of said pressure roller carrier to hold it within said vertical aperture on said vertical plate.

8. The combination of claim 4, wherein said vertical plate has means defining an opening therein in the plane of said strip of sufficient size to accommodate a welding torch positioned in said plane.

9. The combination of claim 4, wherein said means for supporting said block in a desired position includes a horizontal plate integral with said vertical plate and a threaded rod threaded through means defining an opening a said horizontal plate and connected to said movable block.

10. The combination of claim 4, wherein (A) said horizontal flange of the roller carrier has a plurality of horizontally threaded holes therein, and said means for securing said side plate to said horizontal flange include screws threaded through said side plate and into said horizontal threaded holes, (B) a smooth vertical opening in said movable blocks within which said vertical threaded rod is fixed, (C) a second side plate secured to the outer end of the U-leg of said pressure roller carrier to hold it within said vertical aperture on said vertical plate, (D) said vertical plate has an opening therein so positioned that a welding torch may occupy the plane of said strip, (E) said means for supporting said block in a desired position includes a horizontal plate integral with said vertical plate and a threaded rod threaded through means defining an opening in said horizontal plate and connected to said movable block, (F) said pressure roller has a circumferential groove in its periphery for accommodating said strip and is formed of interengaging male and femal parts and a circular bearing surface circumferential to said roller axis formed on said male part for engaging the edge of said strip, and pin means for holding said male and female parts together, (G) said first pair of guide rollers being positioned at different distances from said pressure roller, and the closer guide roller being positioned to engage the edge of said strip which is closer to said work piece rotational axis, (H) said support means including a vertical plate of L-shape having a horizontally extending leg and a vertically extending leg and a horizontal plate secured to said horizontally extending leg, a pivot pin mounted in said machine frame and extending through said horizontal plate, at least one aperture in said horizontal plate, which aperture is elongated in a path circumferential to said pivot pin, and bolt means engaging the top of said plate and passing through said aperture and threaded into said machine frame to hold said plate in a desired position, said horizontal plate having a convex edge portion, a graduated scale formed on said horizontal plate adjacent said convex edge portion and a corresponding graduated scale fixed on said machine frame adjacent said convex edge for comparison with said graduation scale on said plate to assist in precise positioning of said vertical plate, and (I) said guide roller support including a base plate rigidly secured to said support means, a first substantially Z-shaped support having one of its flanges secured to said support means by bolts passing through vertically elongated holes in said flange, the other flange of the said Z-shape support having an opening therethrough within which one guide roller of said first pair of guide rollers is journaled for rotation, a second support fixed to said support means and carrying openings within which said second pair of guide rollers are mounted for rotation and a regulating plate having elongated holes therethrough, bolts passing through said elongated holes in said regulating plate to secure said plate in an adjustable position on said support, the other guide roller of said first pair of guide rollers being mounted for rotation on said regulating plate.

11. The combination of claim 1, wherein said pressure roller has a circumferential groove in its periphery for accommodating said strip.

12. The combination of claim 1, wherein said first pair of guide rollers are positioned at different distances from said pressure roller, and the closer guide roller being positioned to engage the edge of said strip which is closer to said work piece rotational axis.

13. The combination of claim 1, wherein said support means is mounted on said machine frame for rotation about a second axis which is perpendicular to a plane containing said work piece rotational axis, and means for holding said support means.

14. The combination of claim 13, wherein said support means is a vertical plate of L-shape having a horizontally extending leg and a vertically extending leg, a horizontal plate which is secured to said horizontally extending leg, said means for mounting the support means for rotation including a pivot pin mounted in said machine frame and extending through said horizontal plate, said means for holding said plate in a desired angular position including at least one aperture in said horizontal plate, which aperture is elongated in a path circumferential to said pivot pin, and bolt means for engaging the top of said plate and passing through said aperture and threaded into said machine frame to hold said plate in a desired position, said horizontal plate having a convex edge portion, a garduation scale formed on said horizontal plate adjacent said convex edge portion and a corresponding graduation scale fixed on said machine frame adjacent said convex edge for comparison with said graduation scale on said plate to assist in precise positioning of said vertical plate.

15. The combination of claim 1, wherein said pressure roller is formed of interengaging male and female parts and a circular bearing surface circumferential to said roller axis formed on said male part for engaging the edge of said strip, and pin means for holding said male and female parts together.

16. The combination of claim 1, wherein said guide roller support includes a base plate rigidly secured to said support means, a first substantially Z-shaped support having one of its flanges secured to said support means by bolts passing through vertically elongated holes in said flange, the other flange of the said Z-shape support having an opening therethrough within which one guide roller of said first pair of guide rollers is journaled for rotation, a second support fixed to said support means and carrying openings within which said second pair of guide rollers are mounted for rotation and a regulating plate having elongated holes therethrough, bolts passing through said elongated holes in said regulating plate to secure said plate in an adjustable position on said support, the other guide roller of said first pair of guide rollers being mounted for rotation on said regulating plate.

17. The combination of claim 1, including two additional pressure rollers, means mounting said pressure rollers on vertical axes in position to engage opposite sides of said strip, and eccentric cam means for adjustably positioning said additional two pressure rollers being positioned between said guide rollers and said rotational work piece axis.

References Cited

UNITED STATES PATENTS 3,464,101   9/1969   Zubal et al. _____ 29—202X

THOMAS H. EAGER, Primary Examiner

PO-1050
(5/69)

UNITED STATES PATENT OFFICE
CERTIFICATE OF CORRECTION

Patent No. 3,557,427  Dated January 26, 1971

Inventor(s) Edmond Pignal

It is certified that error appears in the above-identified patent and that said Letters Patent are hereby corrected as shown below:

Col. 4, line 6, "fine" should read --five--; line 66, "40a" should read --40e--

Col. 5, line 63, before "a" (1st occurrence) should be inserted --it has--

Col. 7, line 12, "enage" should read --engage--; line 25, "and" should read --an--; line 34 "carriers" should rea --carrier--; line 66, "a" should read --in--

Col. 8, line 14, "femal" should read --female--

Col. 9, line 11, "garduation" should read --graduation

Signed and sealed this 29th day of June 1971.

(SEAL)
Attest:

EDWARD M. FLETCHER, JR.
Attesting Officer

WILLIAM E. SCHUYLER, JR.
Commissioner of Patents